Dec. 1, 1970 K. A. H. GUSTAFSON 3,544,791

VOLTAGE STABILIZING DEVICE CONNECTED TO
A DETECTOR FOR INFRARED RADIATION

Filed Sept. 25, 1968

INVENTOR.
KJELL ARNE HÅKAN GUSTAFSON
BY Hane and Baxley
ATTORNEYS

United States Patent Office 3,544,791
Patented Dec. 1, 1970

3,544,791

VOLTAGE STABILIZING DEVICE CONNECTED TO A DETECTOR FOR INFRARED RADIATION

Kjell Arne Hakan Gustafson, Karlskoga, Sweden, assignor to Aktiebolaget Bofors, Bofors, Sweden, a Swedish company Filed Sept. 25, 1968, Ser. No. 762,540
Claims priority, application Sweden, Sept. 27, 1967, 13,299/67
Int. Cl. G01t *1/16*
U.S. Cl. 250—83.3 5 Claims

ABSTRACT OF THE DISCLOSURE

An AC-amplifier including choppers at its input and output is connected to a detector for infrared radiation, so that slow changes in the direct voltage across the detector are converted into pulses which are amplified and reconverted into an output direct voltage varying in accordance with the input direct voltage but of opposite polarity. The output voltage is fed back to the detector to counteract the original direct voltage across the detector.

BACKGROUND OF THE INVENTION

In infrared cameras diodes are used as detectors which produce a voltage, the amplitude of which varies with the intensity of the received infrared radiation. The detector is connected to an amplifier for amplifying the voltage variation, and the output signal from the amplifier is caused to modulate the intensity of the electron beam in a picture tube. In order that such detectors shall operate with the greatest sensitivity and the most favourable signal-to-noise ratio, the voltage across the detector should be as near zero as possible. Therefore a point on the current axis in the current-voltage characteristic of the detector is chosen as operating point.

The detector is mounted in the camera so that only the radiation passed by the optical system from the photographed object shall fall upon the detector. It is not possible, however, to prevent infrared radiation from certain parts of the camera from falling upon the detector. These parts are mainly the aperture arranged in front of the detector and the background of or the mounting means for the focusing devices (mirror or lens) which focus the incoming radiation upon the detector. The temperature of and the infrared radiation from these parts may vary slowly, and these variations cause a displacement of the operating point of the detector to a range in the characteristic where the voltage across the detector is no longer zero.

The present invention relates to a device for counteracting this undesired displacement of the operating point of the detector.

SUMMARY OF THE INVENTION

According to the invention a voltage sensing circuit is connected in parallel with the detector and is adapted to amplify slow variations in the voltage across the detector and to feed back the amplified voltage to the detector in such sense that the voltage variations across the detector are counteracted.

DRAWING AND DETAILED DESCRIPTION

In the following, the invention will be described more in particular in conjunction with the accompanying drawing.

Figure 1:
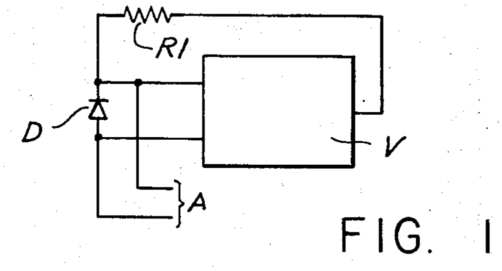
FIG. 1 shows a block diagram of the device according to the invention.

In FIG. 1 the detector is designated D. The detector D is connected via conductors A to a signal amplifier which amplifies those signals from the detector which vary in accordance with the intensity of the radiation falling upon the detector. The amplifier is of known design and will not be described in detail. It has such a frequency response that slow voltage changes due to radiation from parts of the camera are not amplified. However, as mentioned above this radiation causes an undesired displacement of the operating point of the detector, and to counteract this displacement a voltage sensing circuit V is connected in parallel with the detector, and from the output of this voltage sensing circuit a voltage is applied to the detector D via a resistor R1, which voltage opposes the voltage change across the detector caused by this variation.

Figure 2:
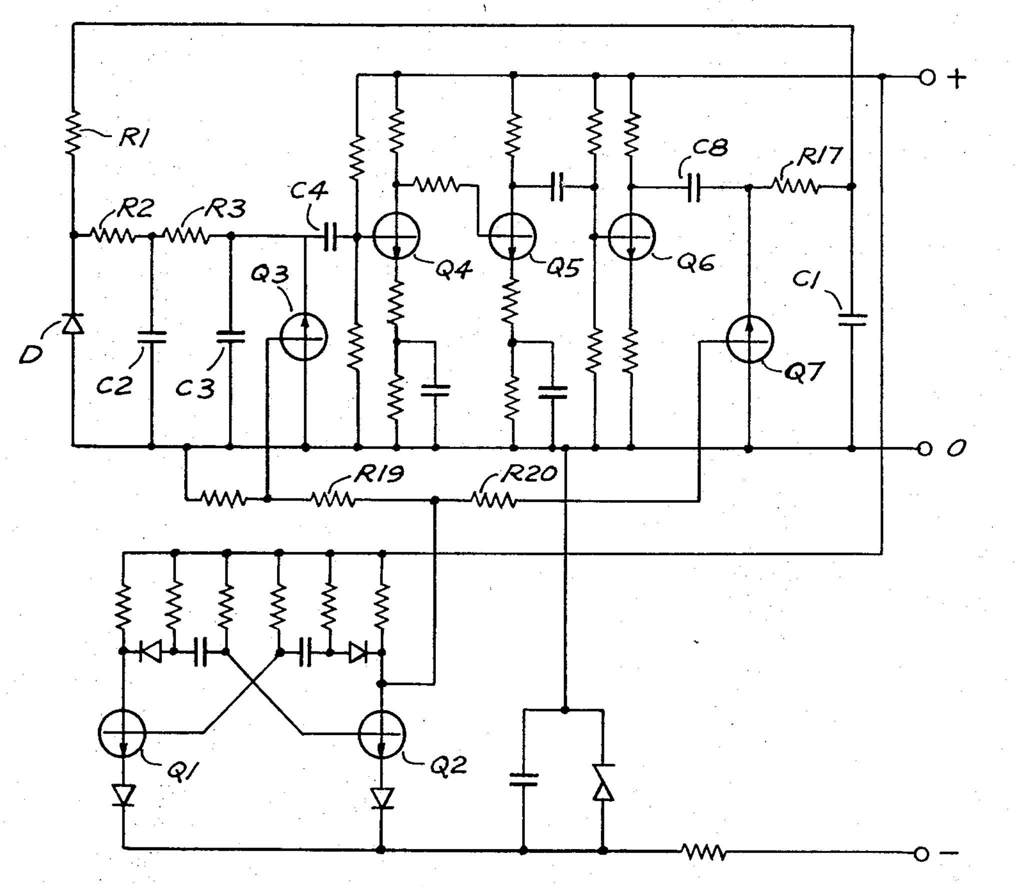
FIG. 2 shows a detailed circuit diagram of an embodiment of the invention.

In the embodiment shown in FIG. 2 the voltage sensing circuit V comprises an alternating voltage amplifier including three transistors Q4, Q5 and Q6 with associated resistors and capacitors. The detector D is connected to the input of this amplifier via an RC-filter consisting of resistors R2 and R3 and capacitors C2 and C3. Parallel to the input of the amplifier is also connnected a transistor Q3 which is arranged to operate as a chopper. Another transistor Q7 which is also arranged to operate as a chopper, is connected across the output of the amplifier. The two transistors Q3 and Q7 are controlled by a multivibrator shown in the left-hand bottom part of FIG. 2. The multivibrator comprises the transistors Q1 and Q2 which are interconnected in known manner by means of resistors, capacitors and diodes. The bases of the two transistors Q3 and Q7 are connected via resistors R19 and R20 respectively to the same output terminal of the multivibrator, and thus transistors Q3 and Q7 will be conductive and non-conductive respectively at the same time. The chopper frequency is not critical. It may be of the order 100 hertz.

If a slowly varying direct voltage appears across the detector D, this direct voltage will be chopped by the cyclically operating chopper transistor Q3 to produce an alternating voltage in the form of pulses with an amplitude varying with the direct voltage. This alternating voltage is applied via the coupling capacitor C4 to the base of the first transistor Q4 of the alternating voltage amplifier formed by transistors Q4, Q5 and Q6. After amplification the alternating voltage is fed from the transistor Q6, via capacitor C8, to the junction or resistor R17 and the base of transistor Q7. Transistor Q7 which operates under the control of the multivibrator as a chopper, making and breaking in time with the alternating voltage, acts as a demodulator for this alternating voltage, and the demodulated voltage charges capacitor C1 via resistor R17. Since the transistor Q7 operates in phase with the transistor Q3 and the output voltage from the alternating voltage amplifier is out of the phase with the input alternating voltage, the direct voltage across capacitor C1 will have a polarity opposite to that of the direct voltage across detector D. The capacitor C1 is connected to the detector via resistor R1, and hereby the voltage change across the detector will be opposed.

The voltage sensing device has a high input resistance so that it does not load the detector. The RC-filter between the detector and the input of the amplifier prevents the voltage variations across transistor Q3 from affecting the detector.

The alternating voltage amplifier may also be so designed that the output voltage is in phase with the input voltage, in which case the transistors Q3 and Q7 must be so controlled that one is conductive while the other one is cut off and vice versa. Other modifications are also possible within the scope of the invention.

What is claimed is:

1. An infrared radiation detection device comprising an infrared radiation detector having at least a pair of terminals adapted to transmit a voltage signal representative of the detected infrared radiation, an alternating voltage amplifier having an input and an output, first connecting means connecting said detector to the input of said alternating voltage amplifier, said first connecting means including a first switching means controllably switchable between a high impedance state and a low impedance state, a capacitor, a resistor connecting one terminal of said capacitor to said detector, second connecting means connecting the output of said alternating voltage amplifier to said capacitor, said second connecting means including a second switching means controllably switchable between a high impedance state and a low impedance state, and control means for controlling said first and second switching means to synchronously switch between said states whereby slow variations in the voltage across said detector are amplified and fed back to said detector in phase opposition.

2. The device of claim 1 wherein said amplifier and said switching means are solid-state devices.

3. The device of claim 1 wherein said control means comprises a free-running oscillator.

4. The device of claim 3 wherein said free-running oscillator, said switching means and said amplifier are solid state devices.

5. The device of claim 1 wherein said first connecting means further includes a signal filter means.

References Cited

UNITED STATES PATENTS 3,094,617 6/1963 Humphries et al. ---- 250—83.3

WILLIAM F. LINDQUIST, Primary Examiner

D. L. WILLIS, Assistant Examiner

U.S. Cl. X.R.

330—102